Jan. 2, 1968  J. BORACK ET AL  3,361,609
PRODUCTION PROCESS FOR EMBOSSABLE MEDIUM
Filed June 16, 1965
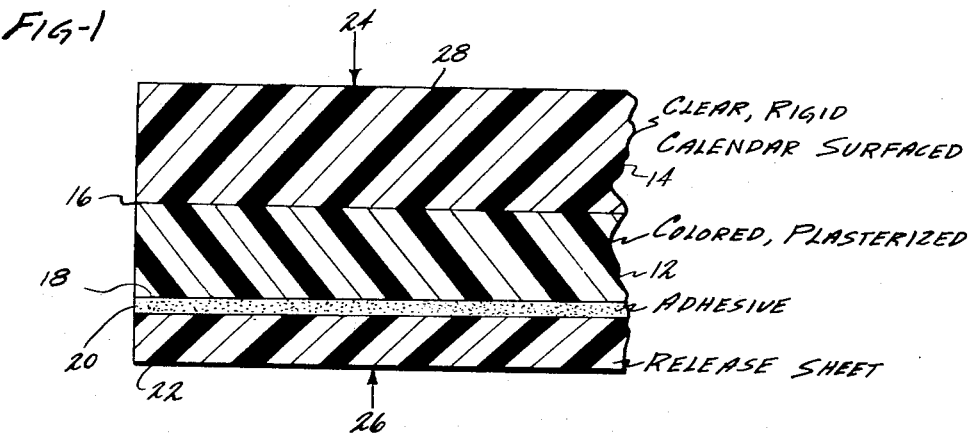
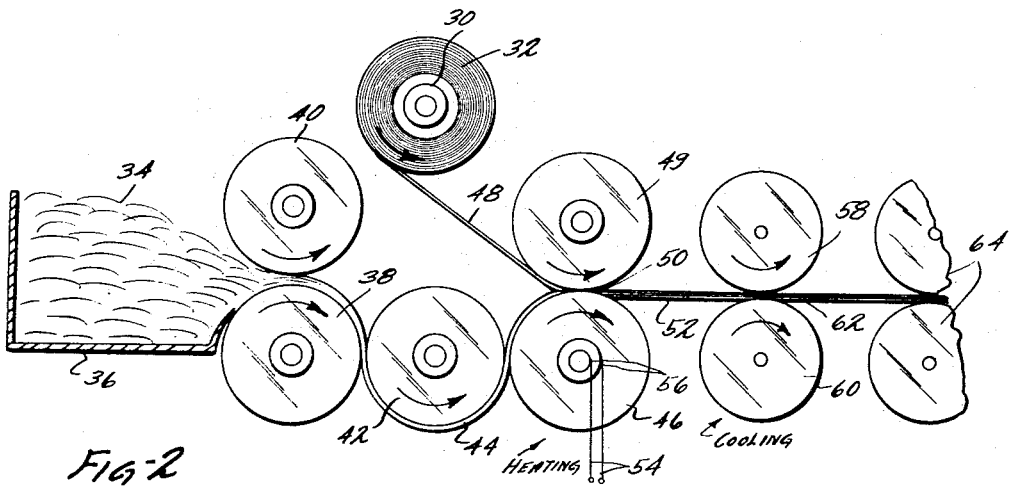
INVENTORS
WARREN T. BUSCHMANN
JOSEPH BORACK
BY Wilson, Robbins & Anderson
ATTORNEYS though the application of heat and pressure to the assembled laminate actually reduces the thickness of both the base layer 12 and the top layer 14, the overall process must be such as to provide a base layer 12 of substantial thickness at the finish of the process. This is so because it is necessary to have a sufficient thickness for the cold-flow deformation indica to cause sufficient displacement of material to produce the color changing effect desired.

United States Patent Office

3,361,609
Patented Jan. 2, 1968

3,361,609
PRODUCTION PROCESS FOR EMBOSSABLE MEDIUM
Joseph Borack, Beverly Hills, and Warren T. Buschmann, Arcadia, Calif., assignors to Com-Tech, Incorporated, a corporation of Delaware
Filed June 16, 1965, Ser. No. 464,443
3 Claims. (Cl. 156—229)

ABSTRACT OF THE DISCLOSURE

A process for making embossable plastic tape as an integral laminate, is disclosed. One of the laminate layers is preformed to a greater thickness than eventually desired for it in the laminate. Another layer is then rolled from plastic dough, reduced in thickness, then mated with the other layer. The two layers are then calendered together (with heat applied) and drawn in tension to a reduced thickness, into positive engagement cooling rollers which exert a compressive force on the laminate until it is set. The laminate then receives adhesive and a release sheet to complete the product.

---

This invention relates generally to a process of manufucturing embossable plastic medium of the type in which the embossment produces a color change.

Certain plastic materials have the characteristic of changing color when subjected to cold flow deformation. Examples of such plastic materials are unplasticized polyvinyl chloride, polyvinyl chloride-polyvinyl acetate copolymers, as well as several others. These materials in their unplasticized form are commonly called rigid plastics, and this color change characteristic has enhanced their use to make labels, identification tags, decorative plaques, and so on. Specifically, a sheet or strip of the rigid plastic material may be embossed with letters or other indicia, which embossing operation not only sets the indica into the plastic in raised or relief form, but additionally causes the indicia to turn white thus providing further definition.

This method of making labels and the like has come into rather widespread use; however, a need remains for an improved process for producing the embossable plastic medium, e.g. sheet or strip, whereby such medium is economical and has the desired characteristics.

Accordingly it is an object of the present invention to provide an improved method of producing an embossable plastic medium, which is economical and has characteristics desirable for such medium.

Another object of the present invention is to provide a process for producing embossable plastic medium which enables fine control of such characteristics as flexibility, color contrast, and thickness.

Still another object of the present invention is to provide an improved process for manufacturing embossable plastic medium of the type wherein embossment produces a distinct color change, which process may be employed to accomplish more uniform medium of desired flexibility, thickness, and color.

Still a further object of the present invention is to provide an improved process for manufacturing embossable plastic medium of the type which undergoes a color change upon embossment, which process incorporates lamination of a flexible, opaque base layer and a rigid transparent plastic surface layer which changes color on stress.

One further object of the present invention is to provide an improved process of manufacturing embossable plastic medium by laminating two plastic sheets together and simultaneously calendering the viewing surface smooth, then placing such laminated medium in tension until cooled to a set temperature.

Further details of these and other novel features of the present invention along with the steps thereof and as well additional objects and advantages of the invention, will become apparent and may now best be understood from a consideration of the following description taken in conjunction with the accompanying drawing which is presented by way of illustrative example only; in which:

FIGURE 1 is a sectional view of an exemplary form of embossing medium constructed in accordance with the process of the present invention; and FIGURE 2 is a diagrammatic representation illustrative of a portion of the process of the present invention.

Referring to the figures in greater detail, it is stressed that the particulars shown are by way of example only and are merely for purposes of illustrative discussion. In particular, no attempt has been made to show any greater details of the process than is necessary for the fundamental understanding of the invention, the description taken with the drawings making apparent to those skilled in the art of mediums for imprinting, and processes of manufacturing the same, how the invention may be variously practiced. In addition, the detailed showings herein are not to be taken as limitations upon the scope of the invention which is defined by the appended claims forming, along with the drawings, a part of this specification.

In accordance with one aspect of the present invention, there is provided a process of manufacturing embossable medium of plastic which undergoes a color change upon embossment, by laminating a top layer of rigid plastic to a base layer of plasticized plastic, which lamination is accomplished simultaneously in the process along with calendar finishing and furthermore wherein the freshly-laminated material is control cooled subsequent to tensioning for uniformity.

As is illustrated in FIGURE 1, one embodiment of an article manufactured in accordance with the process of the present invention is shown to include a base layer 12, which has permanently bonded thereto a top layer 14 of rigid plastic material. The base layer 12 can be constructed of various plasticized plastics as for example copolymer of polyvinyl chloride along with polyvinyl chloride and certain other additives functioning as stabilizers, lubricants, pigments, and plasticizers. Normally, the pigment or coloring agent provided in the base layer 12 is homogeneously dispersed throughout the layer so as to render it completely opaque. The top coating layer 14 is of clear rigid plastic and is laminated to the base layer 14 along an interface 16 as described below. The opposed surface 18 of the base layer 12 which is opposed to the interface 16 then carries a layer of pressure-sensitive adhesive 20 which is protected by a backing or release sheet 22.

The use of embossable medium constructed in accordance with the process of the present invention, as shown in FIGURE 1, is well known in the prior art. However, in general, the medium is embossed by applying pressure thereto as indicated by opposed arrows 24 and 26 normally by means of an embossing machine. As a result, the medium may be embossed by cold-flow distortion to form a raised letter from the surface 14 which letter is further distinct because the cold-flow deformation causes the letter to change color, normally turning white. The contrast of a white letter against the colored background provided by the base layer 12 depends to some extent upon the transparency of the top coating layer 14. Of course, the layer 14 is formed of clear rigid plastic; however, it has been found that by calendering the exposed surface 28 of the layer 14 to provide an exceedingly smooth continuous surface, the transparency is further enhanced. As a result, the process hereof incorporates such a calendering operation thereby improving the visibility of the interface 16 through the top coating layer 14.

The process of manufacturing the embossable medium as shown in FIGURE 1 in accordance with the present invention will now be considered in detail. The base layer material is separately formed preliminary to the other components of the medium. For example, the following ingredients may be combined and blended together.

| Ingredients: | Percent by weight |
|---|---|
| Resin (copolymer of vinyl chloride-vinyl acetate) | 37.5 |
| Resin (polyvinyl chloride) | 37.5 |
| Filler (calcium carbonate) | 1.0 |
| Stabilizer (lead stearate) | 2.0 |
| Lubricant (calcium stearate) | 0.5 |
| Plasticizer (polymeric) | 20.0 |
| Pigment | 1.5 |

These ingredients of an exemplary base layer material are blended in a powdered form then heated to approximately 150° centigrade. The mixture is placed in a mixing mill and heated further during a kneading operation for the time required to convert it into a plastic dough. Subsequently the plastic mix while maintained at a temperature to preserve its plasticity, is rolled into an opaque sheet or layer of approximately .005 inch. The base material may then be taken up on a storage roller for subsequent use in the further process of manufacturing an embossable medium in accordance with the present invention.

In the exemplary formulation, the calcium carbonate and calcium stearate perform certain functions during the calendering process. Specifically, the calcium carbonate acts as a scrubber to prevent material from accumulating on the rollers while the calcium stearate serves as a lubricant to obtain better action of the material passing over the rollers.

Referring to FIGURE 2, the roller 30 is shown to carry a roll 32 of the base material. The technique of using the roll 32 of material will be described below, after a consideration of the formation of the top coating layer 14.

The material of the top coating layer 14 is formed by first combining the following ingredients in a powdered form.

| Ingredients: | Percent by weight |
|---|---|
| Resin (copolymer of vinyl chloride vinyl acetate) | 82.0 |
| Modifier (acrilonitrile butadiene styrene) | 14.6 |
| Stabilizer (lead stearate) | 3.0 |
| Ultra-violet absorber (American Cyanamid U.V. 9) | 0.3 |
| Blue dye (color compensator) | 1.0 |

After mixing, these powdered ingredients are blended and heated to form a plastic dough in substantially the same manner as described with reference to the base stock. The resulting dough 34 (FIGURE 2) is then contained in a feeder 36 from which it may be drawn by a pair of counter-revolving mated rollers 38 and 40. These rollers are driven (as are the subsequently described rollers) by motive power to revolve at a substantially constant rate and are spaced apart to draw the dough from the feeder 36 in a relatively thick layer. The thickness of the layer is reduced somewhat as it passes between the roller 38 and a counter-revolving mated roller 42 which carries the dough sheet 44 onto a heated polished calender roller 46 that mates with an idling roller 49 and between which is passed both the dough sheet 44 and the base sheet 48. As a result, the counter-revolving rollers 46 and 49 mate at a gap 50 through which the transparent dough sheet 44 and the opaque base sheet 48 pass and are laminated together into the unitary laminate sheet 52, the lower surface of which is calendered smooth.

Heat is applied to maintain the roller 46 at a temperature to accomplish the lamination. Some 150° C. has been found desirable for the ingredients in the example. The heat may be from electrical energy supplied through conductors 54 and rings 56. Alternatively, the roller 46 may be heated by steam as a result of connections to a source thereof, as well known in the prior art. The heat and pressure of the roller 46 are also effective in calendering the lower surface of the laminate sheet.

After passing from the gap 50 the laminate sheet 52 is drawn between a pair of counter-revolving cooling rollers 58 and 60 mated at a gap 62 through which the laminate sheet is drawn. The cooling rollers 58 and 60 may simply act as radiators to conduct heat from the laminate sheet and thus contact cool to a set temperature, or alternatively may employ positive cooling. Relative the operation of the cooling rollers 58 and 60, it is important to the process of the present invention that the length of laminate sheet between the cooling rollers and the gap 50 be properly tensioned to accomplish desired uniformity. Therefore, the rollers 58 and 60 are driven at a rate to provide a slightly greater linear surface speed than that of the rollers 46 and 48. That is, the laminate sheet 52 is drawn between the rollers 58 and 60 at a rate of linear speed slightly greater than the linear speed at which the laminate sheet is passed from the gap 50. As a result, a predetermined tension is maintained in the laminate sheet 52 between these sets of rollers, which prevents certain flaws and enhances uniform production. From the cooling rollers 58 and 60 the laminate sheet 52 passes on to subsequent rollers 64 for further cooling and handling.

The operation of the roller 46 in cooperation with the roller 48 is such that an exceedingly smooth surface is applied to the laminate sheet 52 by the polished surface of the roller 46. Specifically, for example, the roller 46 may be formed of highly polished stainless steel so as to calender the lower surface of the laminate 52 with an ultra-smooth surface, which, as described above, serves to improve the transparency of the clear lower layer in the laminate sheet. After the laminate sheet 52 has been suitably cooled, various techniques as well known in the prior art may be employed to apply adhesive to the exposed surface of the base sheet 48 and thereafter to cover the adhesive with a release sheet. Subsequently, the finished product may be cut into tapes, sheets or various other forms for use as an embossable medium.

It is to be noted that the process of joining a sheet of rigid plastic, e.g. the dough sheet 44, and a sheet of flexible or plasticized plastic, e.g. the base sheet 48, permits fine control of flexibility in the resulting medium. This control may be exercised not only by varying the amount of plasticizer in the sheet 48 to some extent but furthermore by providing the two sheets in different relative thicknesses. As a result, when the two sheets are laminated together at some 300° F., the fused bond between them results in a somewhat unitary sheet having an overall flexibility as used in various embossing apparatus.

It is also to be noted that as the laminate sheet 52 passes from the gap 50 it is held under tension by the cooling rollers 58 and 60 to accomplish more uniform laminate sheet.

It should also be noted, that as a result of the composite manner in which calendering, laminating, and tensioning are accomplished in the laminate sheet, considerable production economy results.

There has thus been disclosed an embodiment of a process of manufacture which is capable of being utilized to provide an effective embossable medium, which process is economical and effective.

What is claimed is:

1. A process for manufacturing a laminate plastic sheet useful as an embossable medium, comprising the steps of:

forming a first sheet of opaque plasticized vinyl to be somewhat flexible and of greater thickness than desired in said laminate sheet;

forming plastic dough into a second sheet of substantially clear thermoplastic, maintained in a heated plastic state;

laminating said heated second sheet to said first sheet by applying pressure and heat thereto whereby to preserve said second sheet in a plastic state and simultaneously calendering the exposed surface of said second sheet to a smooth form;

drawing said laminate sheet in significant tension into cooling contact engagement means whereby to lengthen said laminate sheet and reduce it to a set temperature;

maintaining said laminate sheet under pressure until cooled to set to thereby reduce said laminate sheet to a desired thickness; and applying an adhesive to the exposed surface of said first sheet.

2. A process according to claim 1 wherein said plasticized vinyl includes calcium carbonate and calcium stearate.

3. A process according to claim 1 wherein said second sheet is initially formed to an increased thickness and is substantially reduced in thickness by subsequent steps in said process.

References Cited
UNITED STATES PATENTS

| | | | |
|---|---|---|---|
| 2,700,630 | 1/1955 | Bukey et al. | 161—58 |
| 2,771,388 | 11/1956 | Rockey et al. | 156—242 |
| 3,036,927 | 5/1962 | Jerothe | 117—7 |
| 3,048,510 | 8/1962 | Wisotsky | 161—6 |
| 3,309,257 | 3/1967 | Borack | 161—6 |

EARL M. BERGERT, *Primary Examiner.*

M. L. KATZ, *Assistant Examiner.*